Figure 6:
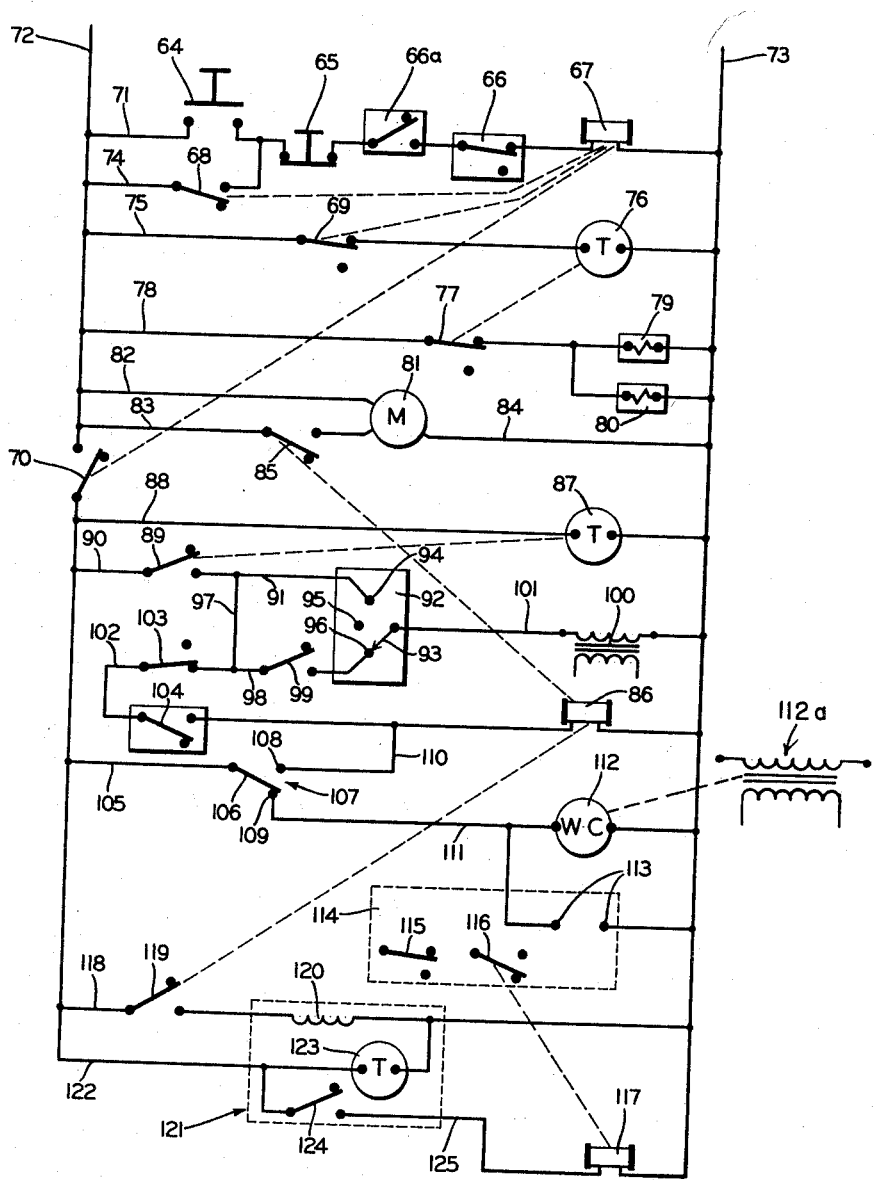

Oct. 22, 1963  K. C. MILLER  3,108,181
WELDING CONTROL CONSTRUCTION
Filed March 14, 1960  3 Sheets-Sheet 1
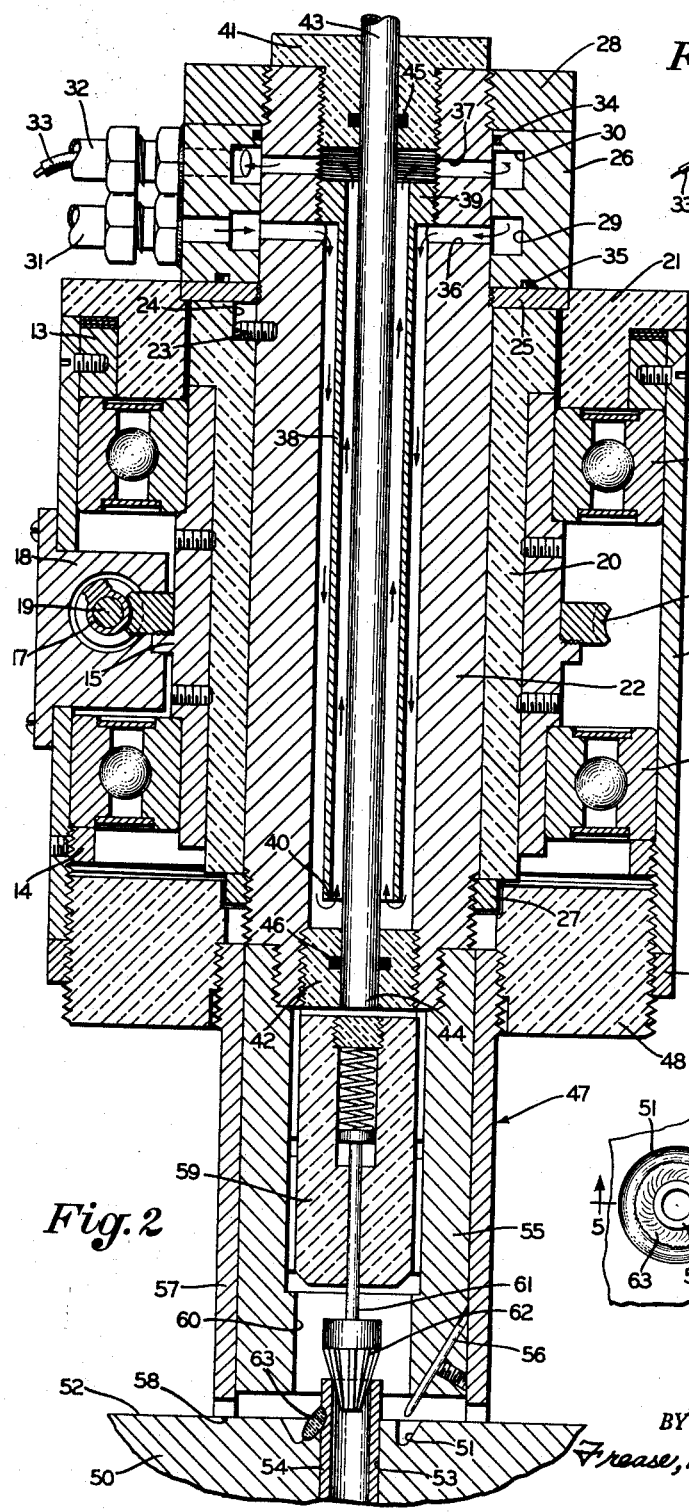
Fig. 2
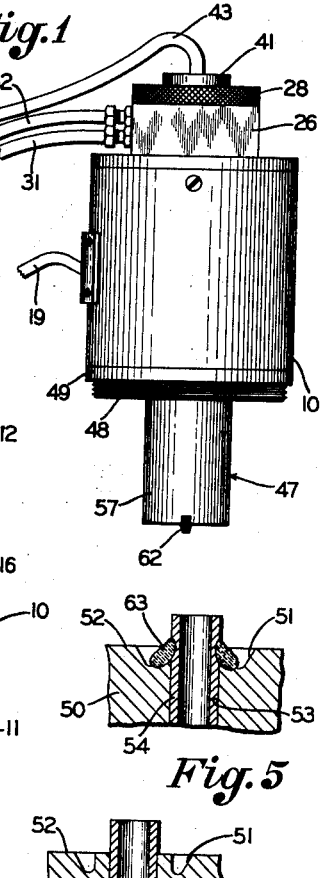
Fig. 1
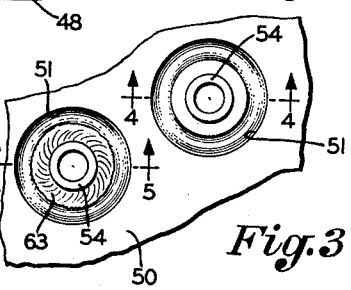
Fig. 5
Fig. 4
Fig. 3
INVENTOR.
Kenneth C. Miller
BY
Frease, Bishop, Johns & Schick
ATTORNEYS Oct. 22, 1963

K. C. MILLER 3,108,181

WELDING CONTROL CONSTRUCTION

Filed March 14, 1960

3 Sheets-Sheet 2

INVENTOR.
Kenneth C. Miller
BY
Frease, Bishop, Johns & Schick
ATTORNEYS

United States Patent Office 3,108,181
Patented Oct. 22, 1963

3,108,181
WELDING CONTROL CONSTRUCTION
Kenneth C. Miller, Massillon, Ohio, assignor, by mesne assignments, to Baldwin-Lima-Hamilton Corporation, Philadelphia, Pa., a corporation of Pennsylvania
Filed Mar. 14, 1960, Ser. No. 14,666
9 Claims. (Cl. 219—131)

My invention relates generally to a construction of welding control for controlling the operation of an arc welding tool. More specifically, my invention relates to a welding control for controlling an automatic welding tool through the initiation, sequential operation, and termination of a preset welding cycle, whereby certain welding operations can be accomplished automatically and without danger of defective welds.

Many forms of welding tools have been provided for use in various welding operations, for instance, welding tools for arc welding tubes to tube sheets in the manufacture of heat exchangers. Furthermore, many of these welding tools are constructed for carrying out a complete welding cycle substantially automatically, with only the positioning of the tool and initiation of the operation being necessary by a workman operating the welding tool.

In the case of welding tools for arc welding tubes to tube sheets in heat exchanger construction, the resulting weld is usually formed by a non-consumable electrode, so that the resulting weld is formed from the basic metals of the tubes and tube sheets. Furthermore, in this particular case, the welds are usually annular, around end portions of the tubes, for securing the tubes to the tube sheets, although similar types of welding tools can be used for other forms of welds, whether annular, straight line, or in other forms.

Many problems are encountered in constructing a welding tool for such welding operations and to properly carry out a complete welding cycle in a substantially automatic manner. For instance, one such problem is that it is desirable to shield the portions of the heat exchanger tube sheets and tubes being welded from the atmosphere by use of various inert gases, in order to prevent oxidation of the parts being welded while these parts are at the welding temperatures and until they have sufficiently cooled to the point where oxidation no longer takes place to any appreciable extent.

Further, additional problems result from the fact that it is desirable to initiate the welding arc and maintain this arc directed at the area where the weld is to be begun in order to provide an initial "puddling" of the weld at this initial point, for insuring a proper weld at the initial point where the metals are first being heated; but after a given degree of "puddling" for a preselected time, it is then necessary to begin relative movement between the welding electrode and the parts being welded in order to provide the continuous weld desired. Furthermore, to properly control the initial puddling of the welding, it is desirable to begin the welding arc at relatively low welding current and gradually increase this welding current to a predetermined point at which time the relative motion between the welding electrode and parts being welded is begun.

Various forms of "start-slope" or "up-slope" controls have been provided for arc welders to control the gradual buildup of welding current to the welding electrode at substantially any timed rate of buildup desired, and these controls have been satisfactory for their particular purpose. It becomes a problem, however, as to how to automatically determine when the welding current has built up to a sufficient magnitude during the "puddling" phase in order to properly accomplish this "puddling" phase without providing an excessive depth to this initial portion of the weld; and at this precise point, within relatively close limits, to then begin the relative movement between the welding electrode and parts being welded in order to carry out the remainder of the weld in a predetermined sequence.

Further, particularly where annular welds are being provided between tubes and tube sheets of heat exchangers, it is desirable after a complete weld has been formed around the circumference of the tube, to overlap the weld and at the same time taper the weld by gradually decreasing the welding current. If the weld is cut off abruptly at the full welding current and without the tapering of the weld, craters will frequently be formed which can result in a defective weld.

For this reason, the tapering of the weld is desirable, and this gradual decreasing of the welding current in order to produce the taper may be accomplished again by the standard "tail-slope" or "down-slope" controls which gradually decrease the welding current at a timed rate. It becomes a further problem, however, as to how to automatically determine when the welding current has reached a safe minimum value in order to produce the taper desired, so that at this minimum value, the entire welding operation can be cut off or stopped.

Thus, it is desirable to provide some means for sensing the buildup of welding current to the welding electrode during the initial "puddling" phase and start the relative motion between the electrode and workpiece at a predetermined value of this current buildup. Also, it is desirable to provide some means for sensing the breakdown of welding current to the electrode at the latter portion of the welding cycle and cut off or extinguish the arc at a predetermined value of this current breakdown. Further, the need for accuracy in such sensing would be dependent on the particular welding operation being performed.

It is, therefore, a general object of the present invention to provide a welding control construction which overcomes the problems and eliminates the difficulties of the prior constructions in a precise and efficient manner.

It is a primary object of the present invention to provide a welding control construction for automatically controlling the various steps of a welding cycle to thereby carry out a specific welding operation, such control being carried out in a novel and accurate manner.

It is a further object of the present invention to provide a welding control construction having means therein for very accurately and precisely sensing the initial buildup of welding current to the welding electrode after the main welding arc has been struck between the welding electrode and workpiece, and at a predetermined value of welding current, to initiate relative movement between the welding electrode and workpiece for properly carrying out the welding operation.

It is still a further object of the present invention to provide a welding control construction having means therein for very accurately and precisely sensing the breakdown or decrease of welding current at the end of a welding cycle, and terminate the entire welding operation at a predetermined value of welding current in order to provide a desired tapered overlap at the end of the weld.

It is also an object of the present invention to provide a welding control construction, preferably including electronic means, which electronically senses the initial buildup of welding current for automatically initiating certain phases of the welding cycle, and also preferably automatically senses the breakdown of welding current at the end of the welding cycle for cutting off the welding operation at a predetermined decreased value of said welding current.

It is still another object of the present invention to provide a welding control construction in which a high-frequency arc is used for striking the main welding arc between the welding electrode and workpiece, with the high-frequency arc automatically being cut off upon the main arc being struck, and with other phases of the welding cycle being set up and other phases started simultaneously with the high-frequency arc being cut off and by the same control means which automatically cuts off this high-frequency arc.

Finally, it is an object of the present invention to provide a welding control construction which satisfies all of the above objects in an efficient and accurate manner for providing welds of maximum uniformity and highest quality.

These and other objects are accomplished by the parts, constructions, arrangements, combinations and subcombinations comprising the present invention, the nature of which is set forth in the following general statement, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the welding control construction comprising the present invention may be stated as including main welder power supply means for selectively supplying electric power to a welding electrode to produce a welding arc between the electrode and a workpiece to be welded during a preset welding cycle. Start-slope control means is operably connected to the power supply means and welding electrode for automatically controlling the buildup of welding current to the electrode at a predetermined rate of increase from a value less than full welding current at the initiation of the welding cycle to said full welding current. Further, tail-slope control means is operably connected to the power supply means and welding electrode for automatically controlling a decrease in welding current from full welding current to a value less than full welding current at a predetermined rate of decrease at the latter portion of the welding cycle.

Still further, the welding control construction of the present invention includes drive means actionable for providing relative movement between the welding electrode and a workpiece to be welded in a predetermined path of travel during a portion of the welding cycle. Also, preferably inert gas shielding means is provided for the welding electrode and workpiece in the area being welded for shielding the weld against oxidation, and water cooling means is provided for members mounting the electrode to dissipate the heat generated by the welding operation.

For purposes of the present invention, the welding control construction also includes first preferably electronic sensing means for sensing the buildup of welding current to the welding electrode by the start-slope control means at the beginning of the welding cycle, with this first sensing means automatically actuating the drive means at a predetermined value of current buildup. In this manner, an initial portion of the welding cycle is provided for "puddling" of the weld, and when the welding current to the electrode has built up to the predetermined value, the relative movement is started between the welding electrode and the workpiece to be welded. Still further, a second preferably electronic sensing means may be provided for sensing the breakdown or decrease of welding current to the electrode by the tail-slop control means at the latter portion of the welding cycle, with this second sensing means automatically terminating the welding current to the electrode by the tail-slope control predetermined decreased value, to thereby extinguish the welding arc at the welding electrode and stop movement by the drive means.

More specifically, the first and second sensing means of this welding control construction may include gaseous discharge devices or their equivalent, preferably in the form of grid controlled electron tubes, connected to an auxiliary current transformer in the main welder transformer of the main welder power supply means, with these grid controlled electron tubes sensing, through the current transformer, the buildup or increase of welding current at the initiation of the welding cycle and the breakdown or decrease of welding current at the latter portion of the welding cycle. These grid controlled electron tubes are constructed to fire or conduct at predetermined values of current signals from the current transformer and thereby sense the predetermined values of welding current buildup and breakdown for actuating the drive means to provide the relative movement between the welding electrode and workpiece in the early portion of the welding cycle and to terminate the welding cycle at the completion of the weld.

The welding control construction may also be provided with high-frequency arc means for initially producing a high-frequency arc between the welding electrode and workpiece upon initiation of the welding cycle, in order to establish the main welding arc between the welding electrode and workpiece. High-frequency arc control means may be provided for cutting off the high-frequency arc immediately and automatically upon the establishment of the main welding arc between the welding electrode and workpiece. This arc control means may also, at the time of cutting off the high-frequency arc, automatically start the buildup of welding current to the electrode and automatically set up the first sensing means to start the operation of this first sensing means in beginning to sense the welding current buildup at this early portion of the welding cycle.

Figure 7:
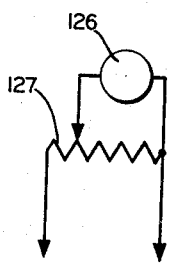
Figure 8:
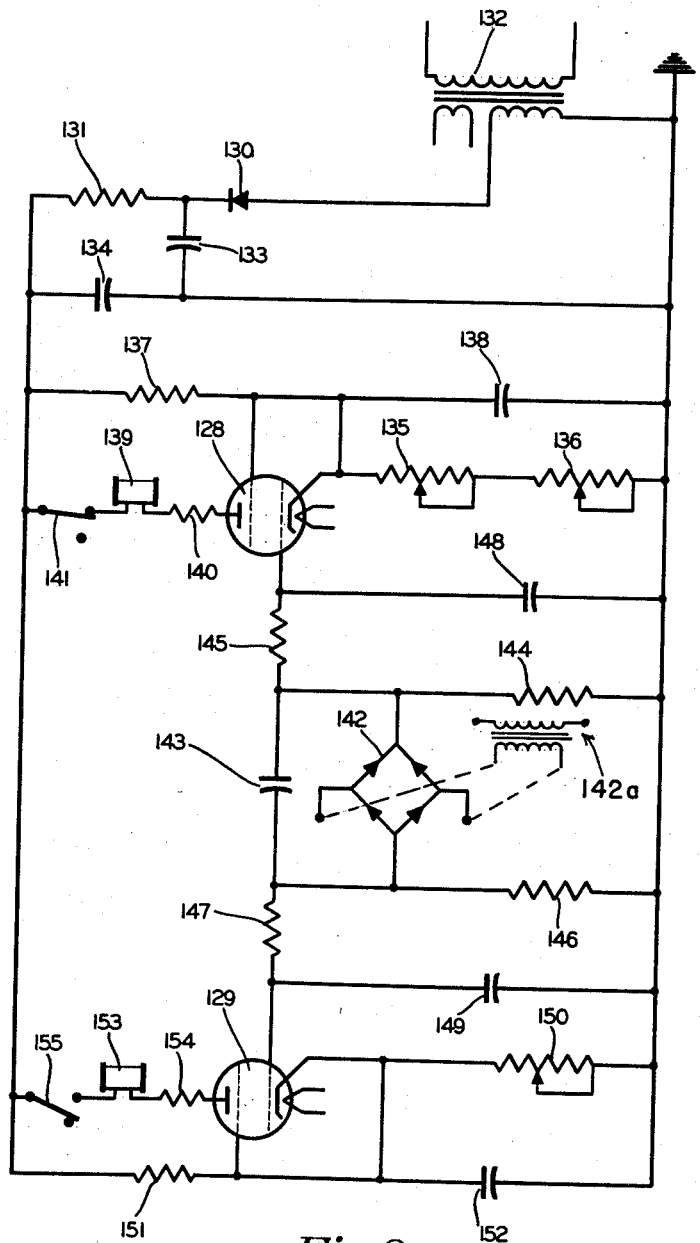

By way of example, an embodiment of the welding control construction of the present invention is illustrated in the accompanying drawings forming a part hereof, wherein like numerals indicate similar parts throughout the several views, and in which:

FIG. 1 is a side elevation of a representative automatic welding tool of the type which may be controlled by the welding control construction of the present invention;

FIG. 2, an enlarged fragmentary vertical sectional view, part in elevation, through the automatic welding tool of FIG. 1, with the welding tool engaged with a workpiece and intermediate a welding cycle;

FIG. 3, a fragmentary top plan view of the workpiece of FIG. 2 showing a portion of a tube sheet with tubes received in tube holes of the tube sheet and with one of the tubes having been welded in place by the automatic welding tool of FIGS. 1 and 2;

FIG. 4, a sectional view, part in elevation, looking in the direction of the arrows 4—4 in FIG. 3;

FIG. 5, a fragmentary section view, part in elevation, looking in the direction of the arrows 5—5 in FIG. 3;

FIG. 6, a circuit diagram of the main sequence control portion of the welding control construction of the present invention connected for controlling the automatic welding tool of FIGS. 1 and 2;

FIG. 7, a circuit diagram of the means controlling the high-frequency starting arc between the welding electrode and workpiece to be welded; and FIG. 8, a circuit diagram of the electronic sensing means of the present invention.

The automatic welding tool shown in FIGS. 1 and 2 for welding the parts and forming the welds, as shown in FIGS. 3, 4 and 5, is representative of the type of welding tool which may be controlled by the welding control construction of the present invention. It is not intended, however, to limit the principles of the present invention to this particular automatic welding tool, but rather, with slight adaptation, the welding control construction of the present invention may be used for controlling many other types of automatic welding tools.

Furthermore, the automatic welding tool shown and described herein is more completely described and claimed in the copending patent application of John C. Cooksey, entitled "Welding Tool for Forming Annular Welds," filed November 29, 1957, Serial No. 699,691. Thus, this automatic welding tool is only representative of the type to be controlled by the welding control construction of the present invention and is not specifically claimed as a part of the present invention other than in the broad combination shown and claimed.

Referring to FIGS. 1 and 2, this automatic welding tool includes a housing member 10 mounting bearings 11 and 12 through retainer ring 13 and lock ring 14, which bearings mount a rotatable drive sleeve 15. A worm ring gear 16 is secured on drive sleeve 15 driven by worm gear 17 in a worm assembly box 18 connected to a flexible drive cable 19.

An insulating block 21 is mounted part within the bearing retainer ring 13 and over insulating sleeve 20 with spindle member 22 mounted within sleeve member 20 locked thereto for rotary drive by pin 23 in slot 24 at the upper end of insulating sleeve 20. Bearing ring 25 is secured to the spindle member 22, retaining and sealing the water jacket housing 26, and a retainer ring 27 is mounted on spindle member 22 engaging the insulating sleeve 20 completing assembly of rotatable spindle 22.

The water jacket housing 26 surrounds the rotatable spindle member 22 held assembled by the nut 28 over the upper end of spindle 22 and this housing 26 is provided with annular cooling means inlet groove 29 and outlet groove 30. Cooling water inlet conduit 31 is connected with the water jacket housing 26 into groove 29 supplying cooling water to the tool, and outlet conduit 32 is connected into outlet groove 30 conveying cooling water away.

Power connection 33 supplying electric power for the arc may extend within cooling water outlet conduit 32 in the usual manner to provide an electrical connection with the water jacket housing 26 and seals 34 and 35 are provided between the stationary water jacket housing 26 and the rotatable spindle 22 and bearing ring 25 preventing leakage of cooling fluid from the cooling system. Holes 36 formed in spindle member 22 communicate between the cooling means inlet groove 29 and the interior of spindle member 22 and holes 37 formed in spindle member 20 communicate between the cooling means outlet groove 30 and the interior of the spindle 22.

Tube 38 is mounted with upper end 39 threaded into spindle 22, between the holes 36 and 37, extending downwardly within the spindle member 22, and plug 41 closes the upper end of the spindle 22 above holes 36 with plug 42 closing the lower end below baffle tube 38. Stationary gas supply tube 43 supplying an inert gas extends axially of the tool terminating at the lower face of the plug 42 with seals 45 and 46 sealing between these rotatable plugs and the stationary tube 43 to seal against cooling fluid.

Thus, chambers are formed within the spindle 22 for the flow of a cooling fluid, such as water, with the cooling fluid flowing through conduit 31 into cooling means inlet grooves 29, through holes 36 to within the spindle around baffle tube 38, downwardly within spindle 22 to open end 40 of baffle tube 38, upwardly within baffle tube 38 and outwardly of gas supply tube 43 to the holes 37, into cooling means outlet grooves 30, and finally outwardly through conduit 32. This path of flow of the cooling fluid is clearly indicated by arrows in FIG. 2.

An adaptor head 47 is mounted on insulating ring 48 and over the lower end of spindle 22, as shown in FIG. 2 and insulating ring 48 is received within case 10, retained adjustably positioned by lock nut 49, as shown. Adaptor head 47 is constructed for carrying out a trepan welding operation between a tube sheet 50, with trepan grove 51 formed in surface 52 surrounding tube hole 53, and tube 54 positioned therein. Thus, adaptor 47 includes electrode holder 55 having electrode member 56 mounted in the lower end of holder 55.

The welding arc for the welding operation is formed between the tip of this electrode and the workpiece, in this case, the tube sheet 50 and tube 54, and the electrode is rotated by the foregoing apparatus to follow the path of the trepan groove 51. Stop member sleeve 57, formed of insulating material, surrounds electrode holder 55, with the lower end 58 extending below electrode holder 55, and by adjusting the stop member sleeve 57, a desired relation can be established between this stop member sleeve and the tip of the electrode 56. Insulating plug 59 is mounted in electrode holder 55 below plug 42 in the spindle 22 and plug 59 carries a spring-pressed pilot and centering member 61 having a centering head 62.

Argon shielding gas is supplied through supply tube 43 and flows out of end 44 between plugs 59 and 42. This shielding gas can then flow downwardly through the grooved bore 60 of the electrode holder 55 outwardly of plug 59, and supply inert shielding gas to electrode 56.

In operation of the representative automatic welding tool shown in FIGS. 1 and 2 and described above, the tool is positioned, as shown in FIG. 2, with the electrode member 56 in proper relation to the trepan groove 51 of the tube sheet and the shielding gas flow is commenced through the supply tube 43, as previously described. Also, the flow of cooling fluid is commenced, as previously described, so that a flow of shielding gas as well as a flow of cooling water prior to the arc being struck is maintained.

This preflow of shielding gas and cooling fluid exhausts the oxygen from the area surrounding where the actual welding operation will take place, replacing it by the inert gas shielding atmosphere, and also insures the proper cooling of this welding tool so that the cooling fluid is flowing when the welding operation has begun. After the proper period of preflow of shielding gas and cooling fluid, a high-frequency arc is struck between the electrode 56 and the tube sheet 50, and this high-frequency arc immediately initiates or strikes the working arc between the electrode and tube sheet at a welding current less than full welding current. Electrical power for these arcs may be supplied through the power connection 33 and through the construction previously described to the electrode.

It is desirable to maintain the electrode member 56 stationary during the initial portion of the welding operation and after the main arc has been struck for initial "puddling" of the weld and during gradual buildup of the welding current to a predetermined value, after which rotation of the electrode member is commenced around the trepan groove 51 and about the axis established by the centering head 62 of the pilot and centering member 61 received within the tube 54. This rotary motion is supplied by an electric drive motor, not shown, through the flexible drive cable 19, worm gear 17, and worm ring gear 16 secured to the spindle member 22, as previously described.

Thus, the weld 63 is formed between the tube sheet 50 and tube 54 inwardly of the trepan groove 51 and completely around the tube 54. The electrode member 56 is in this case preferably a non-consumable electrode so that the weld is formed directly of and between the metal of the tube sheet 50 and tube 54.

Details of the parts before and after the welds are shown more clearly in FIGS. 3, 4 and 5. In FIG. 4 and at the right-hand side of FIG. 3 is shown the tube sheet 50 with the trepan groove 51 and the tube 54 mounted in the tube hole 53 prior to the weld. In FIG. 5 and at the left-hand side of FIG. 3 is shown the assembled parts after the forming of the weld 63.

In the latter portion of the rotation of the electrode member 56 and after this electrode member has completed one complete revolution, the welding current is reduced progressively to form a tapered overlap on the weld 63, at the end of which, rotation of the electrode member 56 is stopped by stopping the drive motor, and at the same time the power to the electrode member is cut off stopping or extinguishing the arc. Flow of the shielding gas and cooling fluid is maintained, however, for a certain period of time after the welding operation has ceased, in order to maintain the electrode member and parts shielded until they have cooled sufficiently to a point where oxidation is no longer a problem, and also to permit proper cooling of the tool.

The foregoing representative welding tool construction may be controlled by the welding control construction of the present invention, circuit diagrams of the preferred embodiment of which are illustrated in FIGS. 6, 7 and 8. In FIG. 6 is shown the circuit diagram of the main sequence control portion connected for controlling the welding tool of FIGS. 1 and 2 and for forming the welds, as shown in FIGS. 2 through 5.

In FIG. 7 is shown a circuit diagram of the means for controlling the high-frequency starting arc between the welding electrode and workpiece to be welded, in this case, between the electrode member 56 and the tube sheet 50 and tube 54, which means cooperates with the main sequence control of FIG. 6 and electronic sensing means of FIG. 8. In FIG. 8 is shown a circuit diagram of an electronic sensing means which also cooperates with the main sequence control of FIG. 6 for beginning movement of the welding electrode member at a predetermined exact value of welding current buildup and for stopping movement of the welding electrode member and extinguishing the welding arc at a predetermined exact value of welding current breakdown or decline, as will be hereinafter described.

Referring to FIG. 6, the manually controlled normally open start switch is indicated at 64, and the manually controlled normally closed stop switch is indicated at 65, with start switch 64 controlling the start of the entire welding operation or cycle including the preflow of the gas shield and cooling fluid, and with the stop switch 65 being provided for interrupting the welding cycle in the event of malfunction or for some other purpose, as desired. A fixture interlock switch, indicated at 66a, may be included, and this switch would normally be closed when the welding tool is properly positioned against the workpiece preparatory to the proper starting of the welding operation, but in the event the welding tool were not properly positioned, this switch would be open and prevent commencement of the welding operation by the start switch 64.

The normally closed welding terminating contacts are indicated at 66, and these contacts when opened terminate the welding cycle except for the postflow of the gas shield and cooling fluid, as will be later described. Further, the control of these normally closed contacts 66 is by a portion of the electronic sensing means, the circuit diagram of which is shown in FIG. 8, and this constitutes a portion of the cooperation between this main sequence control circuit of FIG. 6 and the electronic sensing means circuit of FIG. 8, which will also be later described.

The main control relay is indicated at 67, and this relay controls the normally open contacts 68, the normally closed contacts 69 and the normally open contacts 70. Further, start switch 64, stop switch 65, the fixture interlock switch 66a, and the main control relay 67 are connected in series through a circuit 71 across the main preferably 115-volt supply lines 72 and 73.

The main control relay normally open contacts 68 are connected through a bypass circuit 74 to the main supply line 72 and to the circuit 71 between the start switch 64 and stop switch 65. The main control relay normally closed contacts 69 are connected through a circuit 75 in series with a gas shield and cooling fluid postflow timer 76 across the main supply lines 72 and 73. The main control relay normally open contacts 70 are connected in the main supply line 72 after certain of the components of this main sequence control circuit and before others, as will be hereinafter explained.

The gas and fluid postflow timer 76 controls the normally closed contacts 77 which are connected in a circuit 78 with the gas control solenoid valve 79 and fluid control solenoid valve 80 across the main supply lines 72 and 73. The gas control solenoid valve 79 and fluid control solenoid valve 80 are connected in parallel with each other and in series with the normally closed contacts 77 so that contacts 77 will control the solenoid valves simultaneously.

The main drive motor for the representative welding tool hereinbefore described is connected through the circuits 82 and 83 to the main supply line 72 and through the circuit 84 to the main supply line 73. The normally open contacts 85 are connected in the circuit 83 between the main supply line 72 and the drive motor 81 for controlling power to and operation of the drive motor, and these normally open contacts 85 are controlled by a drive motor control relay 86, the connection and control of which will be hereinafter described.

A gas shield and cooling fluid preflow timer 87 is connected through a circuit 88 across the main supply lines 72 and 73, and this timer 87 controls the normally open contacts 89. Normally open contacts 89 are connected through circuit 90 to the main supply line 72 and through the circuit 91 to the high-frequency arc switch 92.

Switch 92 is manually movable, having the movable contact 93 which may be manually adjusted to connect with one of the continuous high-frequency arc contact 94, the off contact 95 or the start controlled high-frequency arc contact 96. The circuit 91 connects the gas and fluid preflow normally open contacts 89 to the continuous high-frequency arc contact 94 of the switch 92.

A circuit 97 is connected to the circuit 91 between the preflow timer contacts 89 and the continuous high-frequency arc contact 94, with this circuit 97 being connected through a circuit 98 and the high-frequency arc control contacts 99 to the start controlled high-frequency arc contact 96 of switch 92. The normally open contacts 99 are controlled by the high-frequency starting arc control, the circuit diagram of which is shown in FIG. 7, and these contacts 99 constitute a portion of the cooperation between the high-frequency starting arc control of FIG. 7 and this main sequence control of FIG. 6.

The movable contact 93 of switch 92 along with the high-frequency arc transformer 100 are connected through the circuit 101 to the main supply line 73. Thus, when the preflow timer normally open contacts 89 are closed and the switch movable contact 93 is manually moved to the continuous arc contact 94 of this switch, the high-frequency arc transformer 100 will be connected across the main supply lines 72 and 73. Further, with the switch movable contact 93 manually moved into connection with the start controlled arc contact 96, as shown in FIG. 6, and with the pre-flow timer normally open contact closed, the transformer 100 will be connected across the main supply lines 72 and 73 but through and controlled by the high-frequency arc control contacts 99, previously described, and which are in turn controlled by the high-frequency starting arc control of FIG. 7.

As will be more clearly understood after a complete description of the circuit diagrams of FIGS. 6, 7 and 8 and their relation to the representative welding tool to be controlled thereby and hereinbefore described, this high-frequency arc switch 92 is, therefore, constructed for selective manual movement to the continuous high-frequency arc contact 94 to the off contact 95 or the start controlled high-frequency arc contact 96. In the case of movement of the movable contact 93 to the continuous arc contact 94, a high-frequency arc is established between the electrode member of the welding tool and a workpiece upon the closing of the preflow timer normally open contacts 89, and this high-frequency arc remains even after the main welding arc has been struck and throughout the entire welding operation. In the case where the movable contact 93 is moved to the off contact 95, all circuits to the high-frequency arc transformer 100 are interrupted so that this transformer will be completely disconnected from the circuit during all portions of the welding operation.

Finally, in the case where the movable contact 93 is moved to the start controlled high-frequency arc 96, the high-frequency arc transformer 100 is controlled through both the preflow timer normally open contacts 89 and the high-frequency arc control contacts 99, so that with power connected to the electrode member of the welding tool, the control contacts 99 will be closed as controlled by the circuit of FIG. 7, and the transformer 100 will be energized upon the closing of the preflow timer normally open contacts 89, thereby striking or establishing a high-frequency arc between the electrode member and the workpiece. As soon as this high-frequency arc is established between the electrode member and workpiece, however, it will immediately establish the main welding arc between this electrode member and workpiece, and the establishment of the main welding arc through the circuit of FIG. 7 will immediately open the high-frequency arc control contacts 99, thereby cutting off power to the transformer 100 and interrupting the high-frequency arc for the remainder of the welding cycle. For the purposes of controlling the foregoing representative welding tool, the movable contact 93 is positioned in contact with the start controlled high-frequency arc contact 96.

Also connected to the circuit 97 is the circuit 102, which is connected through the normally closed circuit establishing contacts 103, and these contacts 103 again are controlled by the high-frequency starting arc control of FIG. 7. Circuit 102 is further connected through the normally open drive motor relay contacts 104, which are controlled by the electronic sensing means of FIG. 8. Finally, this circuit 102 is connected through the drive motor control relay 86 to the main supply line 73.

Thus, the purpose of the circuit establishing contacts 103 when closed is to set up a circuit from main supply line 72 through circuit 90 and preflow timer contacts 89, through circuit 97, and through a portion of circuit 102 to the drive motor relay contacts 104, as determined by the high-frequency starting arc control of FIG. 7, and the closing of the drive motor relay contacts 104 is determined by the electronic sensing means of FIG. 8 for completing the circuit from the main supply line 72 through the drive motor control relay 86 to the main supply line 73. Further, the circuit establishing contacts 103 form a further cooperation between the high-frequency starting arc control of FIG. 7 and the present main sequence control of FIG. 6, and the drive motor relay contacts 104 form a further cooperation between the electronic sensing means of FIG. 8 and the present main sequence control of FIG. 6.

A circuit 105 is connected from the main supply line 72 to the movable contact 106 of a manually controlled welder switch, generally indicated at 107, which welder switch also includes a no-weld contact 108 and a weld contact 109. The no-weld contact 108 of the welder switch 107 is connected through a circuit 110 to the previously described circuit 102 between the drive motor relay contact 104 and the drive motor control relay 86, as shown.

The weld contact of welder switch 107 is connected by a circuit 111 through the weld contactor 112 to the main supply line 73 as well as through the slope control main supply contacts 113 to the main supply line 73. For normal operation of the welding cycle, the manually movable contact 106 of the welder switch 107 will be connected with the weld contact 109 providing a circuit from main supply line 72 through circuit 105, switch 107, circuit 111 and through the parallel connected weld contactor 112 and slope control main supply contacts 113 to the main supply line 73. When it is desired, however, to eliminate the weld contactor 112 and slope control main supply contacts 113 from the entire circuit for originally setting the various elements and timers in order to carry out the particular welding operation with the particular welding tool, at which time actuation of the weld contactor and slope controls would not be desired, the movable contact 106 of welder switch 107 can be moved to the no-weld contact 108.

The weld contactor 112 is a standard unit forming a part of a standard D.C. welding transformer and control unit including the main welder transformer 112a so that actuation of the weld contactor 112 establishes a D.C. voltage at the electrode member of the welding tool and a current flow as soon as the welding arc has been established between the electrode member and the workpiece being welded. The slope control main supply contacts 113 also form a part of a standard slope control unit 114, with these supply contacts supplying power to the slope control unit.

The construction of the standard D.C. welding transformer and control unit including the main welder transformer 112a is well known and conventional so that it need not be further described other than to point out that it includes the transformer and rectifier supplying the D.C. power to the electrode member of the foregoing welding tool for providing the main welding arc between the electrode member and the workpiece. The slope control unit is likewise standard and conventional and need not be further described here other than to state its purpose as being for increasing the welding current at the beginning of the actual welding cycle at a predetermined rate of increase from a value less than full welding current to full welding current through the start-slope or up-slope portion thereof, and for decreasing the welding current at a predetermined rate at the latter portion of the actual welding cycle through the tail-slope or down-slope portion thereof from full welding current to a value less than full welding current at which point the actual welding cycle is terminated by cutting off or extinguishing the main welding arc, as will be hereinafter described.

As shown in FIG. 6, this slope control unit 114 includes the normally closed start-slope contacts 115 which are controlled by the high-frequency starting arc control circuit of FIG. 7 and, when closed, cause the operation of the start-slope portion of this slope control unit 114. Further, the slope control unit 114 includes the normally open tail-slope contacts 116 which are controlled by the tail-slope control relay 117 and, when closed, cause the operation of the tail-slope portion of the slope control unit 114, the connection of the control relay 117 in the present circuit being hereinafter described.

A circuit 118 is connected from the main supply line 72 through the normally open timer clutch contacts 119, through the timer clutch control coil 120 of the main welding timer, generally indicated at 121, and to the main supply line 73. Another circuit 122 is connected from the main supply line 72 through the timer motor 123 of the main welding timer 121 and then through the circuit 118 to the main supply line 73.

Finally, the main welding timer 121 includes the normally open tail-slope control relay contacts 124, which contacts are controlled by this main welding timer. These relay contacts 124 are connected by circuit 122 to the main supply line 72 and by a circuit 125 through the tail-slope control relay 117 to the main supply line 73.

The main welding timer 121 is of standard construction having a clutch timer motor 123 which, although actuated and running, will not begin the timing operation until the timer clutch control coil 120 is energized engaging the clutch of the timer, at which time the actual timing operation begins. The tail-slope control relay contacts 124 controlled by timer 121 are open during the timing operation or timing cycle and are closed at the end of this timing cycle to actuate the tail-slope control relay 117.

Referring to FIG. 7, the circuit diagram of the means for controlling the high-frequency starting arc between the welding electrode and workpiece to be welded includes the high-frequency arc control relay 126 connected to the adjustable resistor 127, which in turn is connected across the welder output terminals of the standard D.C. welding transformer and control unit previously described and which supplies the power for the welding arc between the electrode member and workpiece being welded. This high-frequency arc control relay controls the normally open high-frequency arc control contacts 99, the normally closed circuit-establishing contacts 103, and the normally closed start-slope contacts 115 in the main sequence control circuit of FIG. 6 and as previously described.

Further, this high-frequency arc control relay 126 also controls a set of normally closed start-slope sensing means contacts which are a part of the electronic sensing means of FIG. 8 as will be hereinafter described. This, therefore, constitutes the cooperation between this high-frequency starting arc control of FIG. 7 and the electronic sensing means of FIG. 8.

This high-frequency arc control relay 126 is designed and adjusted through the adjustable resistor 127 so that when the D.C. welding transformer and control unit is supplying no load voltage to the electrode member of the welding tool, which would be after this D.C. welding transformer and control unit is actuated but prior to the main welding arc being established between the electrode member and workpiece, the relay 126 is actuated, thereby moving the high-frequency arc control contact 99 to closed position, the circuit establishing contacts 103 to open position, and the start-slope contacts 115 to open position. When, however, the main welding arc is established between the electrode member and workpiece and the voltage through this high-frequency arc control relay 126 immediately and automatically drops to load voltage which would be of a considerably lower value, this load voltage is not sufficient to actuate relay 126 so that the relay will return to normal position, thereby opening the high-frequency arc control contacts 99, closing the circuit-establishing contacts 103, and closing the start-slope contacts 115.

As an example, in one particular contruction of the welding controls of the present invention, the no-load welder voltage was 70 volts and the high-frequency arc control relay 126 was designed and set for actuation at this value of voltage, whereas the load welder voltage was approximately 12 volts, and the relay 126 was designed and set so as not to be actuated at this load voltage value. The operation of this high-frequency starting arc control of FIG. 7 and the cooperation thereof with the main sequence control of FIG. 6 and electronic sensing means of FIG. 8 will be more clearly understood after the complete description of the operation of the welding control construction of the present invention herein illustrated, which complete description will be hereinafter set forth.

The circuit diagram of the electronic sensing means of the present invention is shown in FIG. 8. In broad terms, this electronic sensing means performs two functions, the first of which is to electronically sense the buildup of welding current at the beginning of the actual welding cycle by the slope control unit, previously described, and actuate certain electrical components or members at the instant at which this welding current has reached a predetermined value. The second function of this electronic sensing means is to electronically sense the breakdown or decline of the welding current at the latter portion of the actual welding cycle and actuate certain electrical members at the instant at which this welding current has reached a predetermined decreased value.

From the broad standpoint, it is possible to perform these sensing functions for sensing the welding current buildup and breakdown by the use of current relays which may be originally constructed or selectively set to operate at or above certain current values and not operate below these certain current values. Where the maximum degree of sensing accuracy is the most advantageous or required, however, it is desirable to use the electronic sensing means as hereinafter described, the circuit of which is shown in FIGURE 8.

As shown in FIG. 8, this electronic sensing means circuit includes two standard thyratron electron tubes, one being indicated at 128 and one at 129. In general terms, the electron tubes 128 and 129 are grid controlled tubes, the conduction through which is determined by a preset holdoff bias voltage. As will be hereinafter explained, the electron tube 128 is controlled by a positive grid voltage buildup, and the electron tube 129 is controlled by a negative grid voltage decline.

The bias and plate voltages of both of the electron tubes 128 and 129 are supplied through a rectifier 130 and resistor 131 from a standard preferably 115-volt transformer 132 in conjunction with the capacitors 133 and 134. First, considering the electron tube 128, the cathode bias voltage is provided through and determined by the adjustable resistors 135 and 136 in conjunction with the resistor 137 and capacitor 138. The adjustable resistor 135 provides the main adjustment for the cathode bias voltage with the adjustable resistor 136 being provided for a more accurate adjustment of the adjustable resistor 135.

The plate load of the electron tube 128 is the sensing means relay 139 in conjunction with the resistor 140 and normally closed start-slope sensing means contacts 141. Thus, when the holdoff bias voltage of electron tube 128 is overcome by the positive grid signal on this tube, the tube will fire or conduct, thereby energizing the sensing means relay 139, provided the start-slope sensing means contacts 141 are closed.

The sensing means relay 139 controls the drive motor relay contacts 104 of the main sequence control circuit of FIG. 6, previously described, so that the conduction of the electron tube 128 actuates the relay 139, thereby closing the normally open drive motor relay contacts 104 of the main sequence control circuit. The start-slope sensing means contacts 141 are controlled by the high-frequency arc control relay 126 of the high-frequency starting arc control circuit, shown in FIG. 7 and previously described, with these contacts 141 being normally closed, so that when the relay 126 of the high-frequency starting arc control circuit is actuated, contacts 141 are opened, but when relay 126 is not actuated or in its normal position, these contacts 141 are in their normally closed position.

The positive signal for the grid of electron tube 128 is supplied from the diode rectifier bridge 142, which bridge in turn receives the signal from an auxiliary current transformer 142a, mounted on the secondary side of the main welder transformer 112a of the standard D.C. welding transformer and control unit but prior to the rectifying of this main welding power. Thus, this signal from the main welder transformer 112a by the auxiliary current transformer 142a is A.C. and varies in magnitude directly with the main welding current to the electrode member of the welding tool as supplied by this D.C. welding transformer and control unit.

The rectifier bridge 142 rectifies this signal from the auxiliary current transformer 142a changing it to D.C., after which this signal is filtered by the capacitor 143 and then applied to the voltage divider created by the resistors 144, 145, 146 and 147 and the capacitors 148 and 149. This supplies a positive signal to the grid of the electron tube 128 and a negative signal to the grid of the electron tube 129.

Thus, by adjusting the holdoff bias voltage on the cathode of electron tube 128 to a preset value through the adjustment of the adjustable resistors 135 and 136, when the positive signal voltage on the grid from the auxiliary current transformer 142a through the rectifier bridge 142 reaches a value balancing or overcoming this preset bias voltage, the tube 128 will fire or conduct. This electron tube 128 is, therefore, arranged and set to sense a predetermined buildup of a positive signal, the buildup of which is directly related through the auxiliary current transformer 142a to a predetermined buildup of welding current to the electrode member of the welding tool and which buildup of welding current is controlled by the start-slope portion of the slope control unit, as previously described. The holdoff bias voltage is, of course, set to be overcome by a signal on the grid caused by an exact predetermined welding current value.

The cathode bias voltage of the electron tube 129 is provided through and determined by the adjustable resistor 150 in conjunction with the resistor 151 and capacitor 152. The plate load of tube 129 is the sensing means relay 153 along with the resistor 154 and the normally open tail-slope sensing means contacts 155.

The holdoff bias voltage of the electron tube 129 is set by the variable resistor 150 so that firing or conduction of the tube is prevented by the negative grid signal from the auxiliary current transformer through the rectifier bridge 142 and so that tube 129 will be prevented from conducting at full welding current to the electrode member of the welding tool. Further, this holdoff bias voltage will prevent tube 129 from conducting until this welding current is reduced or declines to a preset value, at which preset and precalculated point, the holdoff bias voltage of tube 129 is overcome or balanced by the decline of negative grid signal, causing the tube to conduct and energize the sensing means relay 153, provided the tail-slope sensing means contacts 155, which are normally open, have previously been closed.

The sensing means relay 153 controls the normally closed welding terminating contacts 66 of the main sequence control circuit of FIG. 6 and previously described, and when relay 153 is actuated, it opens these normally closed contacts 66. The normally open tail-slope sensing means contacts 155 are controlled by the tail-slope control relay 117 of the main sequence control circuit of FIG. 6, and are closed by this relay 117 when the relay is actuated.

As previously described in dicussing the main sequence control circuit of FIG. 6, the welding current to the electrode member of the welding tool is decreased at a predetermined rate as the latter portion of the actual welding cycle by the tail-slope portion of the slope control unit, so that the negative signal to the grid of this electron tube 129 is decreased at this time for the ultimate conduction of tube 129. Thus, the breakdown of welding current by the tail-slope portion of the slope control unit is sensed through the auxiliary current transformer 142a by this electron tube 129, and at an exact preset and predetermined value of welding current decrease, this tube 129 automatically actuates certain electrical elements, in this case, the sensing means relay 153.

In operation of the embodiment of the welding control construction of the present invention herein described in detail, for controlling the sequential operation of the representative welding tool shown in FIGS. 1 and 2 and hereinbefore described, the welding tool is first properly positioned against the tube sheet 50 and tube 54, as shown in FIG. 2, closes the fixture interlock switch 66a of the main sequence control circuit, shown in FIG. 6, if such a switch is provided in the circuit. The start-switch 64 is then manually closed and, since the stop switch 65 is normally closed and the welding terminating contacts 66 are normally closed, this actuates the main control relay 67.

Actuation of the main control relay 67 closes the normally open contacts 68 of the bypass circuit 74, opens the normally closed timer contacts 69 of the timer circuits 75, and closes the normally open contacts 70 in the main supply line 72 between the circuits 83 and 88.

Closing of the normally open contacts 68 in the bypass circuit 74 provides a circuit from the main supply line 72, through bypass circuit 74 to circuit 71, and through circuit 71, including the stop switch 65, the fixture interlock switch 66a, the welding terminating contacts 66, and the main control relay 67, to the main supply line 73.

Start switch 64 may therefore be released, moving back to its normally open position, and the main control relay 67 will remain actuated. Opening of the normally closed timer contacts 69 in timer circuit 75 causes the gas and fluid postflow timer 76 to reset, ready for a timed operating cycle, but this timer will not start its timing operation until the timer contacts 69 are again closed.

The resetting of the gas and fluid postflow timer 76, however, causes this timer to close the gas and fluid solenoid valve contacts 77 of circuit 78, thereby actuating the gas control solenoid valve 79 and fluid control solenoid valve 80, starting the preflow of the inert gas shield for the electrode member 56 and the portions of the tube sheet 50 and the tube 54 being welded, as shown in FIG. 2, and also starting the preflow of cooling fluid in the welding tool, as shown in FIG. 2. This flow of the gas shield and cooling fluid continues throughout the entire welding cycle until terminated after the postflow phase, as will be hereinafter described.

The welding tool drive motor 81 at this point remains nonactuated in view of the normally open motor contacts 85 of circuit 83. Thus, the electrode member 56 of the welding tool of FIG. 2 remains stationary at this point with respect to the tube sheet 50 and tube 54.

Closing of the normally open contacts 70 in the main supply line 72 by the main control relay 67, as previously described, directs power to circuit 88 actuating the gas and fluid preflow timer 87, so that this timer begins its timing cycle for timing the preflow of the gas shield and cooling fluid. Closing of contacts 70 also directs power to circuit 90, but since the normally open contacts 89 remain open until the gas and fluid preflow timer 87 has completed its timing cycle, no power flows in this circuit nor in the circuits 97, 98, 101 or 102.

Still further, closing of contacts 70 directs power to the circuit 105, and, since the welder switch 107 has been set with the movable contact 106 connected with the weld contact 109, power will be directed into circuit 111, actuating the weld contactor 112 and providing power to the slope control main supply contacts 113. Actuation of the weld contactor 112 directs power from the standard D.C. welding transformer and control unit previously described to the electrode member 56 of the welding tool of FIG. 2, but there will be no welding current to electrode member 56, since no arc has been struck between this electrode member and the workpiece, in this case, the tube sheet 52 and tube 54.

Actuation of the D.C. welding transformer and control unit does, however, actuate the high-frequency arc control relay 126 of the high-frequency starting arc control circuit of FIG. 7, since, with no arc being struck between the electrode member and workpiece, the power to the electrode member is at the higher no-load voltage. Actuation of this high-frequency arc control relay 126 of FIG. 7 opens the normally closed start-slope contacts 115 in the slope control unit, and since the tail-slope contacts 116 of this slope control unit are normally open, even though power has been supplied to this slope control unit through the slope control main supply contacts 113, there is neither the start of a welding current buildup or breakdown in the D.C. welding transformer and control unit by this slope control unit.

Actuation of the high-frequency arc control relay 126 of FIG. 7 also closes the normally open high-frequency arc control contacts 99 in circuit 98, but no power is directed to the high-frequency arc transformer 100 in view of the normally open contacts 89 in circuit 90 remaining open, as controlled by the gas and fluid preflow timer 87 previously described. Still further, actuation of the high-frequency arc control relay 126 of FIG. 7 opens the normally closed circuit establishing contacts 103 in circuit 102, but no power is directed to the drive motor control relay 86, again in view of the normally open contacts 89 remaining open, and also in view of the normally open drive motor relay contacts 104 controlled by the sensing means relay 139 of the electronic sensing means circuit of FIG. 8 remaining open. Finally, actuation of the high-frequency arc control relay 126 of FIG. 7 opens the normally closed start-slope sensing means contacts 141 of the electronic sensing means circuit of FIG. 8, so that the portion of this sensing means circuit which senses the buildup of welding current to the electrode member 56 of the welding tool of FIG. 2 has not at this point been set up.

Still referring to the main sequence control circuit of FIG. 6, closing of the contacts 70 in the main supply line 72 directs power to circuit 118, but since the normally open timer clutch contacts 119 remain open as controlled by the drive motor control relay 86 of circuit 102, there is no engagement of the timer clutch by the timer clutch control coil 120. Closing of these contacts 70 does, however, direct power from the main supply line 72 through the circuit 122, through the timer motor 123, and through a portion of circuit 118 into the main supply line 73, so that timer motor 123 begins to operate.

As this power is directed through the circuit 122, power is directed from this circuit 122 into the circuit 125. The tail-slope control relay 117 for controlling the normally open tail-slope contacts 116 is not actuated or energized, however, because of normally open tail-slope control relay contacts 124 of the main welding timer 121 remaining open. As previously described, these tail-slope control relay contacts 124 remain open until the end of the timed cycle by the main welding timer 121, and this time cycle has not even been started at this point in view of the timer clutch control coil 120 of the timer not having been energized.

Thus, the overall welding cycle has been started, and, during this gas shield and cooling fluid preflow phase of the cycle, the main control relay 67 of circuit 71 is energized, the gas and fluid postflow timer 76 of circuit 75 has been reset but has not started its particular timing cycle, the gas control solenoid valve 79 and fluid control solenoid valve 80 have been opened providing a flow of shielding gas to the electrode member 56 of the welding tool of FIG. 2 and also providing cooling fluid flowing through this welding tool, and the drive motor 81 for driving the electrode member 56 of the welding tool in its annular path remains off so that the electrode member 56 remains stationary. Also, in this shielding gas and cooling fluid preflow phase, the gas shield and cooling fluid preflow timer 87 is operating timing this preflow phase of the cycle, the high-frequency arc transformer 100 remains off so that there is no high-frequency starting arc provided between the electrode member 56 and tube sheet 50 of FIG. 2, the drive motor control relay 86 remains non-energized, and the weld contactor 112 has been energized directing main welding power to the electrode member 56 of FIG. 2, but there is no power flow in view of no arc having been struck from the electrode member 56 and workpiece of FIG. 2.

Still further, in this preflow phase, power has been directed to the slope control main supply contacts 113 of the slope control unit 114, but this slope control unit does not begin to function since neither the start-slope nor tail-slope portions thereof have been energized, and the timer motor 123 of the main welding timer 121 has been energized and is running but has not begun its timing cycle in view of the non-energization of the timer clutch control coil 120, and the tail-slope control relay 117 remains non-energized. Finally, in this preflow phase, with the D.C. welding transformer and control unit at the higher no-load voltage, the high-frequency arc control relay 126 of FIG. 7 is actuated, and the circuits to the electron tubes 128 and 129 of the sensing means circuit of FIG. 8 have not been set up in view of the start-slope sensing means contact 141 to tube 128 being open and the normally open tail-slope sensing means contact 155, as controlled by the tail-slope control relay 117, being open.

After the gas shield and cooling fluid preflow timer 87 has completed its preset timing cycle measuring the gas and fluid preflow phase of the overall welding cycle, this timer closes the normally open contacts 89 of circuit 90, thereby directing power from the main supply line 72 through contacts 89, high-frequency arc control contacts 99, high-frequency arc switch 92, and high-frequency arc transformer 100 to the main supply line 73. As before described, the high-frequency arc control contacts 99 had been previously closed by the high-frequency arc control relay 126 of FIG. 7, and this, therefore, energizes the high-frequency arc transformer 100 which strikes a high-frequency arc from the electrode member 56 to the tube sheet 50 of FIG. 2.

Striking of the high-frequency arc between the electrode member 56 and tube sheet 50 of FIG. 2 immediately strikes or establishes the main working arc between this electrode member and workpiece. This is true in view of the weld contactor 112 previously having been energized as before described, with the establishment of the main welding or working arc being made possible by the first establishment of the high-frequency arc.

As soon as the main working arc is established, the power to the electrode member 56 of FIG. 2 immediately drops to the lower load voltage, thereby automatically de-actuating the high-frequency arc control relay 126 of FIG. 7. De-actuation of relay 126 immediately opens the normally open high-frequency arc control contacts 99, thereby cutting off power through the high-frequency arc transformer 100, which immediately cuts off or extinguishes the high-frequency arc between the electrode member 56 and workpiece of FIG. 2 while the main working arc remains.

De-actuation of relay 126 also closes the normally closed circuit establishing contacts 103 in circuit 102, thereby setting up this circuit, but power does not flow therein to the drive motor control relay 86 in view of the drive motor relay contacts 104 controlled by the electronic sensing means circuit of FIG. 8 remaining open. For this reason, at this time, the drive motor 81 still remains non-energized and the electrode member 56 of FIG. 2 remains stationary, even though the main working arc has been established between this electrode member and the workpiece.

Still further, de-actuation of relay 126 closes the normally closed start-slope contacts 115 of the slope control unit 114. Since the slope control unit has previously been supplied power for operation through the slope control main supply contacts 113, this begins operation of the start-slope portion of this slope control unit and begins the building up, at a predetermined rate of increase, the welding current to the electrode member 56 of the welding tool of FIG. 2.

Finally, de-actuation of relay 126 closes the normally closed start-slope sensing means contacts 141 in the plate circuit of the electron tube 128 of FIG. 8. Thus, the electronic sensing means of FIG. 8 begins to sense the welding current buildup by the start-slope portion of the slope control unit through electron tube 128 and the positive signal supplied to the grid of this electron tube from the auxiliary current transformer 142a mounted in the main welder transformer 112a of the standard D.C. welding transformer and control unit which is supplying the power for the main working arc between the electrode member 56 and workpiece.

This, therefore, starts the "puddling" phase of the overall welding cycle, during which the initial "puddling" of the weld takes place from the metals of the tube sheet 50 and tube 54 of FIG. 2. The length of this "puddling" phase is determined by the preset rate of welding current buildup by the start-slope portion of the slope control unit 114 and the preset exact value of welding current as sensed by the electronic sensing means of FIG. 8 which will cause a balancing of the cathode bias holdoff of the electron tube 128 of this sensing means and cause this electron tube to fire or conduct.

At the preselected value of welding current buildup by the start-slope portion of the slope control unit 114, which may be a value less than full welding current or may be full welding current, dependent on the conditions present and the setting of this portion of the electronic sensing means of FIG. 8, the positive signal from the auxiliary current transformer 142a to the grid of the electron tube 128 overcomes the cathode holdoff bias of this tube, causing the tube 128 to fire or conduct, and since the plate circuit to this electron tube 128 has previously been set up by the closing of the start-slope sensing means contacts 141, this actuates the sensing means relay 139 of FIG. 8 which closes the normally open drive motor relay contacts 104 in circuit 102 of the main sequence control of FIG. 6. Closing of contacts 104 directs power through the drive motor control relay 86 in circuit 102, actuating relay 86, which closes the normally open contacts 85 in circuit 83 to the drive motor 81 and also closes the normally open timer clutch contacts 119 in circuit 118 through the timer clutch control coil 120.

This begins the operation of the drive motor 81 so that the electrode member 56 of the welding tool of FIG. 2 begins its path of travel around the trepan groove 51 in the tube sheet 50 for forming the continuous annular weld between tube sheet 50 and tube 54, as previously described. This also, through the timer clutch control coil 120, engages the clutch of the main welding timer 121 so that this timer begins the timing of the period of travel of the electrode member, and this has been preset so that the electrode member makes substantially one complete revolution around the tube 54 of FIG. 2 prior to the end of this timed cycle of the main welding timer 121.

The start-slope portion of the slope control unit 114, of course, continues to function building up or increasing the welding current to the electrode member 56 of FIG. 2 at the preset rate until full welding current is reached. Thereafter, full welding current is maintained to this electrode member until the operation of the tail-slope portion of the slope control unit 114 begins operation.

At the end of the timed cycle of the main welding timer 121 and after the electrode member 56 has completed substantially one revolution around tube 54, the main welding timer closes the tail-slope control relay contacts 124 of this timer, thereby directing power through circuit 125 and through the tail-slope control relay of this circuit 125. This actuates relay 117 which closes the normally open tail-slope contacts 116 in the tail-slope portion of the slope control unit 114, starting operation of this tail-slope portion which begins the gradual breakdown or decrease of the welding current to the electrode member 56 of FIG. 2 at a predetermined rate of decrease.

This actuation of relay 117 also closes the normally open tail-slope sensing means contacts 155 of the electronic sensing means of FIG. 8 which sets up the plate circuit of the electron tube 129, starting the actual sensing of the welding current breakdown by the tail-slope portion of the slope control unit 114. The firing or conducting of tube 129 has, of course, been set through the cathode holdoff bias so that this firing will be controlled by the negative grid signal from the auxiliary current transformer 142a, as previously described, and this conduction through tube 129 will not take place until the negative grid signal from the auxiliary current transformer 142a has decreased to a value balancing the cathode holdoff bias.

As the welding current to the electrode member 56 of FIG. 2 is gradually decreased by the tail-slope portion of the slope control unit 114 while the drive motor 81 continues to drive this electrode member in its annular path around the tube 54 of FIG. 2, the weld 63 between the tube sheet 50 and tube 54 of FIG. 2 is gradually tapered forming a tapered overlap for the weld. Finally, the tapered overlap phase is completed when the negative signal from the auxiliary current transformer 142a to the grid of the electron tube 129 is decreased to the point at which it balances the cathode holdoff bias of this tube as determined by this cathode holdoff bias and the signal from the welding current to the electrode member 56 of FIG. 2 through the auxiliary current transformer 142a.

At this point, the electron tube 129 fires or conducts, and in view of the prior closing of the tail-slope sensing means contacts 155 in the plate circuit of this tube, the sensing means relay 153 is actuated. Actuation of the sensing means relay 153 of this sensing means of FIG. 8 opens the normally closed welding terminating contacts 66 in the circuit 71 of the main sequence control of FIG. 6, thereby de-actuating the main control relay 67 in this circuit 71.

De-actuation of the main control relay 67, referring to FIG. 6, opens the normally open contacts 68 in the bypass circuit 74, closes the normally closed contacts 69 in the timer circuit 75, and opens the normally open contacts 70 in the main supply line 72 between the circuits 83 and 88. This interrupts the bypass circuit 74 so that power cannot reach circuit 71 despite any repositioning of the welding terminating contact 66, directs power through circuit 75 and the gas shield and cooling fluid postflow timer 76 so that this timer begins its individual timing cycle, and interrupts the flow of power through main supply line 72 to all elements of this main sequence control circuit below the circuit 83.

Thus, the opening of the contacts 70 in the main supply line 72 interrupts power to the gas shield and cooling fluid pre-flow timer 87 causing this timer to reset and open the normally open contacts 89 in circuit 90, and de-actuates drive motor control relay 86 which opens the normally open contacts 85 in circuit 83 stopping the drive motor 81 and opens the timer clutch contacts 119 de-energizing the timer clutch control coil 120 of the main welding timer 121. Further, opening of the contacts 70 cuts off power to the weld contactor 112 extinguishing the main welding arc, cuts off power to the slope control main supply contacts 113 shutting down the slope control unit 114, and shuts off power to the timer motor 123 shutting down the main welding timer 121.

This also shuts off the power to the tail-slope control relay 117 de-actuating this relay which opens the normally open tail-slope contacts 116, thereby setting this tail-slope portion of the slope control unit 114 preparatory for another welding cycle. Further, the shutting down of the main welding timer 121 opens the normally open tail-slope control relay contacts 124 in preparation of another welding cycle.

Thus, during this postflow phase of the overall welding cycle, the electrode member 56 is once again stationary, the main welding arc between this electrode member 56 and the tube sheet 50 and tube 54 has been extinguished, with the weld 63 being complete and extending completely around the tube 54 between the tube and tube sheet with a tapered overlap. Since, however, the normally closed contacts 77 in the circuit 78 to the gas control solenoid valve 79 and fluid control solenoid valve 80 remain closed during the individual timing cycle of the gas shield and cooling fluid preflow timer 76, the shielding gas continues to flow through the welding tool of FIG. 2 to the electrode member 56 and the area of the weld 63, and the cooling fluid continues to flow through this welding tool, in a postflow phase as determined by the timer 76.

At the end of the predetermined individual timing cycle of the gas shield and cooling fluid postflow timer 76, this timer opens the normally closed contacts 77 in circuit 78. This thereby cuts off power to the gas control solenoid valve 79 and fluid control solenoid valve 80, stopping the postflow of shielding gas and cooling fluid and completing the overall welding cycle.

Thus, the welding tool of FIGS. 1 and 2 has been precisely and completely carried through a welding cycle for forming a weld 63 between a tube sheet 50 and tube 54 to provide the weld, as shown in FIGS. 3, 4 and 5, by the welding control construction of the present invention, the preferred embodiment of which is shown in FIGS. 6, 7 and 8. Furthermore, by the unique operation of the main sequence control of FIG. 6, the high-frequency starting arc control of FIG. 7, and the sensing means of FIG. 8, this welding operation has been carried out in an exact manner providing the maximum of perfection of the weld, as hereinbefore discussed.

One of the important features of the welding control construction of the present invention is the manner in which the high-frequency starting arc control of FIG. 7 automatically extinguishes the high-frequency arc when the main welding or working arc is established, and at the same time sets up or establishes certain circuits both in the main sequence control of FIG. 6 and the electronic sensing means of FIG. 8. Another important feature is the unique manner in which the buildup of welding current is sensed in order to determine the "puddling" phase and start the electrode drive motor at the proper exact instant, and the manner in which the breakdown of welding current is sensed to provide an exact predetermined tapered overlap of the weld and cut off the welding portion of the welding cycle at the proper instant.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction illustrated and described herein is by way of example, and the scope of the present invention is not limited to the exact details of the construction shown.

Having now described the invention, the construction, operation and use of a preferred embodiment thereof, and the advantageous new and useful results obtained thereby; the new and useful construction and reasonable mechanical equivalents thereof obvious to those skilled in the art are set forth in the appended claims.

I claim:

1. Welding control construction including electrical supply means having a welding transformer for supplying welding current and voltage to an electrode and establishing an arc between said electrode and a workpiece, slope control means operably connected to the supply means for increasing the welding current from a value less than full welding current to full welding current at a predetermined rate during a welding cycle, current transformer means operably connected to the supply means welding transformer for supplying an electrical signal relating to the increase in value of welding current as the welding current is increased by the slope control means, other electrical components operable for controlling a portion of said welding cycle, electrical control means operably connected to certain of said other components actionable by electrical power for operating said certain other components, selectively adjustable electronic sensing means having a grid controlled electron tube conducting after a buildup of grid voltage has balanced a selectively adjustable preset cathode holdoff bias voltage, the electron tube being operably connected to the current transformer means with the electrical signal of said current transformer means supplying the grid voltage for said tube, and the electron tube being operably connected to the electrical control means and conducting electrical power to said electrical control means for actuating said electrical control means when the grid voltage of said tube has balanced the preset cathode holdoff bias voltage of said tube as determined by the welding current reaching a predetermined value.

2. Welding control construction including electrical supply means having a welding transformer for supplying welding current and voltage to an electrode and establishing an arc between said electrode and a workpiece, slope control means operably connected to the supply means for decreasing the welding current from full welding current to a value less than said full welding current at a predetermined rate during a welding cycle, current transformer means operably connected to the supply means welding transformer for supplying an electrical signal relating to the decrease in value of welding current as the welding current is decreased by the slope control means, other electrical components operable for controlling a portion of said welding cycle, electrical control means operably connected to certain of said other components actionable by electrical power for operating said certain other components, selectively adjustable electronic sensing means having a grid controlled electron tube conducting after a decline of grid voltage has balanced a selectively adjustable preset cathode holdoff bias voltage, the electron tube being operably connected to the current transformer means with the electrical signal of said current transformer means supplying the grid voltage for said tube, and the electron tube being operably connected to the electrical control means and conducting electrical power to said electrical control means for actuating said electrical control means when the grid voltage of said tube has balanced the preset cathode holdoff bias voltage of said tube as determined by the welding current reaching a predetermined value.

3. Welding control construction including electrical supply means for supplying welding current and voltage to an electrode and establishing an arc between said electrode and a workpiece, slope control means operably connected to the supply means and having an up-slope portion for increasing the welding current from a value less than full welding current to full welding current at a predetermined rate during an initial portion of a welding cycle and a down-slope portion for decreasing the welding current from full welding current to a value less than said full welding current at a predetermined rate during a latter part of a welding cycle, signal means operably connected to the electrical supply means for supplying an electrical signal relating to the increase in value of welding current as the welding current is increased by the up-slope portion from said value less than full welding current to said full welding current and relating to the decrease in value of welding current as the welding current is decreased by the down-slope portion from said full welding current to said value less than full welding current, other electrical components operable for controlling portions of said welding cycle, first electrical control means operably connected to certain of said other components actionable by electrical power for operating said certain other components, second electrical control means operably connected to at least a part of said other components actionable by electric power for operating said part of said other components, electronic sensing means having a first sensing device and a second sensing device, the first sensing device being operably connected to the signal means and said first electrical control means for sensing the electrical signal from said signal means and conducting electrical power to said first electrical control means for actuating said first electrical control means when the welding current has reached a predetermined increased value, and the second sensing device being operably connected to the signal means and said second electrical control means for sensing the electrical signal from said signal means and conducting electrical power to said second electrical control means for actuating said second electrical control means when the welding current has reached a predetermined decreased value.

4. Welding control construction including electrical supply means having a welding transformer for supplying welding current and voltage to an electrode and establishing an arc between said electrode and a workpiece, slope control means operably connected to the supply means and having an up-slope portion for increasing the welding current from a value less than full welding current to full welding current at a predetermined rate during an initial portion of a welding cycle and a down-slope portion for decreasing the welding current from full welding current to a value less than said full welding current at a predetermined rate during a latter part of a welding cycle, current transformer means operably connected to the supply means welding transformer for supplying an electrical signal relating to the increase in value of welding current as the welding current is increased by the up-slope portion and relating to the decrease in value of welding current as the welding current is decreased by the down-slope portion, other electrical components operable for controlling portions of said welding cycle, first electrical control means operably connected to certain of said other components actionable by electrical power for operating said certain other components, second electrical control means operably connected to at least a part of said other components actionable by electric power for operating said part of said other components, selectively adjustable electronic sensing means having a selectively adjustable first sensing device and a selectively adjustable second sensing device, the first sensing device being operably connected to the current transformer means and said first electrical control means for sensing the electrical signal from said current transformer means and being adjusted for conducting electrical power to said first electrical control means for actuating said first electrical control means when the welding current has reached a predetermined increased value, and the second sensing device being operably connected to the current transformer means and said second electrical control means for sensing the electrical signal from said current transformer means and being adjusted for conducting electrical power to said second electrical control means for actuating said second electrical control means when the welding current has reached a predetermined decreased value.

5. Welding control construction including electrical supply means having a welding transformer for supplying welding current and voltage to an electrode and establishing an arc between said electrode and a workpiece, slope control means operably connected to the supply means and having an up-slope portion for increasing the welding current from a value less than full welding current to full welding current at a predetermined rate during an initial portion of a welding cycle and a down-slope portion for decreasing the welding current from full welding current to a value less than said full welding current at a predetermined rate during a latter part of a welding cycle, current transformer means operably connected to the supply means welding transformer for supplying an electrical signal relating to the increase in value of welding current as the welding current is increased by the up-slope portion and relating to the decrease in value of welding current as the welding current is decreased by the down-slope portion, other electrical components operable for controlling portions of said welding cycle, first electrical control means operably connected to certain of said other components actionable by electrical power for operating said certain other components, second electrical control means operably connected to at least a part of said other components actionable by electrical power for operating said part of said other components, selectively adjustable electronic sensing means having a first sensing device and a second sensing device, the first sensing device having a grid controlled electron tube conducting electrical power after a buildup of grid voltage has balanced a selectively adjustable preset cathode holdoff bias voltage, the second sensing device having a grid controlled electron tube conducting electrical power after a decline of grid voltage has balanced a selectively adjustable preset cathode holdoff bias voltage, the first and second sensing device tubes being operably connected to the current transformer means with the electrical signal of said current transformer means supplying the grid voltages for said tubes, the first sensing device tube being operably connected to the first electrical control means and conducting electrical power to said first electrical control means for actuating said first electrical control means when the grid voltage of said first sensing device tube has balanced the preset cathode holdoff bias voltage of said tube as determined by the welding current reaching a predetermined increased value, and the second sensing device tube being operably connected to the second electrical control means and conducting electrical power to said second electrical control means for actuating said second electrical control means when the grid voltage of said second sensing device tube has balanced the preset cathode holdoff bias voltage of said tube as determined by the welding current reaching a predetermined decreased value.

6. Welding control construction including electrical supply means having a welding transformer for supplying welding current and voltage to an electrode and establishing an arc between said electrode and a workpiece, slope control means operably connected to the supply means and having an up-slope portion for increasing the welding current from a value less than full welding current to full welding current at a predetermined rate during an initial portion of a welding cycle and a down-slope portion for decreasing the welding current from full welding current to a value less than said full welding current at a predetermined rate during a latter part of a welding cycle, current transformer means operably connected to the supply means welding transformer for supplying an electrical signal relating to the increase in value of welding current as the welding current is increased by the up-slope portion and relating to the decrease in value of welding current as the welding current is decreased by the down-slope portion, an electrically actuated drive motor operably connected to one of the electrode and workpiece for providing relative motion between the electrode and workpiece when actuated, first electrical component means operably connected to the drive motor operable for actuating the drive motor, second electrical component means operably connected to the drive motor operable for de-actuating the drive motor and operably connected to the welding transformer for cutting off the welding current and voltage to the electrode to thereby cut off the arc between the electrode and workpiece, electrical sensing means operably connected to the current transformer means and the first electrical component means for sensing said electrical signal from said current transformer means relating to the increase in value of welding current and operating said first electrical component means when the welding current has reached a predetermined welding value to actuate the drive motor, and the sensing means also being operably connected to the current transformer means and the second electrical component means for sensing said electrical signal from said current transformer means relating to the decrease in value of welding current and operating said second electrical component means when the welding current has reached a predetermined decreased value to de-actuate the drive motor and cut off the arc between the electrode and workpiece.

7. Welding control construction including main electrical supply means for supplying welding current and voltage to an electrode and establishing a main working arc between said electrode and a workpiece upon the establishment of a high-frequency arc between said electrode and workpiece, high-frequency electrical supply means operably connected to the electrode for supplying high-frequency power to said electrode for establishing said high-frequency arc between said electrode and workpiece to thereby establish the main working arc between said electrode and workpiece, means for initiating the high-frequency electrical supply means, slope control means operably connected to the main electrical supply means for increasing the welding current from a value less than full welding current to full welding current at a predetermined rate after the main working arc has been established, a slope control electrical component operable for commencing operation of the slope control means, high-frequency arc control means operably connected to the main electrical supply means and high-frequency electrical supply means automatically actionable upon the establishing of said main working arc between said electrode and workpiece for simultaneously de-energizing the high-frequency electrical supply means to cut off the high-frequency arc and operating said slope control electrical component commencing operation of said slope control means, other electrical components operable for controlling a portion of said welding cycle, and sensing means operably connected to the main electrical supply means and certain of said other components for sensing said increasing of welding current from said value less than said full welding current to said full welding current and operating said certain other components when the welding current has reached a predetermined value.

8. Welding control construction including main electrical supply means having a welding transformer for supplying welding current and voltage to an electrode and establishing a main working arc between said electrode and a workpiece upon the establishment of a high-frequency arc between said electrode and workpiece, high-frequency electrical supply means operably connected to the electrode for supplying high-frequency power to said electrode for establishing said high-frequency arc between said electrode and workpiece to thereby establish the main working arc between said electrode and workpiece, means for initiating the high-frequency electrical supply means, slope control means operably connected to the main electrical supply means for increasing the welding current from a value less than said full welding current to full welding current at a predetermined rate after the main working arc has been established, current transformer means operably connected to the main electrical supply means welding transformer for supplying an electrical signal relating to the increase in value of welding current as the welding current is increased by the slope control means, a slope control electrical component operable for commencing operation of the slope control means, high-frequency arc control means operably connected to the main electrical supply means welding transformer and high-frequency electrical supply means automatically actionable upon the establishing of said main working arc between said electrode and workpiece for simultaneously de-energizing the high-frequency electrical supply means to cut off the high-frequency arc and operating said slope control electrical component commencing operation of said slope control means, other electrical components operable for controlling a portion of said welding cycle, and electrical sensing means operably connected to the current transformer means and certain of said other components for sensing said electrical signal from said current transformer means and operating said certain other components when the welding current has reached a predetermined value.

9. Welding control construction including main electrical supply means having a welding transformer for supplying welding current and voltage to an electrode and establishing a main working arc between said electrode and a workpiece upon the establishment of a high-frequency arc between said electrode and workpiece, the welding voltage to the electrode supplied by the main electrical supply means welding transformer being of a given no-load value prior to the establishment of the main working arc and automatically dropping to a lower load value upon the establishment of the main working arc, high-frequency electrical supply means including a high-frequency transformer operably connected to the electrode for supplying high-frequency power to said electrode for establishing said high-frequency arc between said electrode and workpiece to thereby establish the main working arc between said electrode and workpiece, high-frequency control means operably connected to the high-frequency electrical supply means including relay coil controlled contacts movable between open and closed positions, the high-frequency control means contacts directing electrical power to the high-frequency electrical supply means for energizing the high-frequency transformer when said contacts are in closed position and interrupting the flow of power to said high-frequency electrical supply means for de-energizing the high-frequency transformer when said contacts are in open position, slope control means operably connected to the main electrical supply means for increasing the welding current from a value less than full welding current to full welding current at a predetermined rate after the main working arc has been established, slope control contacts movable from open to closed position for operating the slope control means, relay coil means operably connected to the main electrical supply welding transformer for receiving electrical power from said welding transformer including said welding voltage, the relay coil means being actuated at no-load voltage and being de-actuated at the lower load voltage, the relay coil means being operably connected to the high-frequency control means contacts maintaining said high-frequency control means contacts in closed position when the relay coil means is actuated and moving the high-frequency control means contacts to open position when the relay coil means is de-actuated, the relay coil means being operably connected to said slope control contacts for moving said slope control contacts from open to closed position when the relay coil means having been actuated is de-actuated to commence operation of the slope control means, current transformer means operably connected to the main electrical supply means welding transformer for supplying an electrical signal relating to the increase in value of welding current as the welding current is increased by the slope control means, other electrical components operable for controlling a portion of said welding cycle, electrical control means operably connected to certain of said other components actionable by electrical power for operating said certain other components, selectively adjustable electronic sensing means having a grid controlled electron tube contacting after a buildup of grid voltage has balanced a selectively preset cathode holdoff bias voltage, the electron tube being operably connected to the current transformer means with the electrical signal of said current transformer means supplying the grid voltage for said tube, and the electron tube being operably connected to the electrical control means and conducting electrical power to said electrical control means for actuating said electrical control means when the grid voltage of said tube has balanced the preset cathode holdoff bias voltage of said tube as determined by the welding current reaching a predetermined value.

References Cited in the file of this patent

UNITED STATES PATENTS

| | | |
|---|---|---|
| 2,151,378 | Elsey et al. | Mar. 21, 1939 |
| 2,152,785 | Blankenbuehler | Apr. 4, 1939 |
| 2,460,990 | Kratz et al. | Feb. 8, 1949 |
| 2,832,000 | Steele | Apr. 22, 1958 |
| 2,845,526 | Cameron et al. | July 19, 1958 |
| 2,890,392 | Bruck et al. | June 9, 1959 |
| 2,920,252 | Pinckaers | Jan. 5, 1960 |
| 2,929,917 | Kruml et al. | Mar. 22, 1960 |
| 2,933,592 | Bichsel | Apr. 19, 1960 |
| 2,951,972 | Pomazal | Sept. 6, 1960 |
| 2,960,626 | Mulder | Nov. 15, 1960 |